United States Patent
Golioto

(10) Patent No.: US 8,700,093 B2
(45) Date of Patent: Apr. 15, 2014

(54) WIRELESS COMMUNICATION BASE STATION WITH CURRENT LIMITING CAPABILITY

(75) Inventor: Igor Golioto, Fairfield, NJ (US)

(73) Assignee: 8631654 Canada Inc., Ottawa, Ontario (CA)

(*) Notice: Subject to any disclaimer, the term of this patent is extended or adjusted under 35 U.S.C. 154(b) by 3038 days.

(21) Appl. No.: 11/234,900

(22) Filed: Sep. 26, 2005

(65) Prior Publication Data

US 2007/0072644 A1    Mar. 29, 2007

(51) Int. Cl.
- H04M 1/00    (2006.01)
- H04B 1/38    (2006.01)
- H02H 7/122   (2006.01)
- H03G 3/00    (2006.01)
- H03G 3/20    (2006.01)

(52) U.S. Cl.
USPC ......... 455/561; 455/572; 363/56.03; 330/127

(58) Field of Classification Search
USPC ................ 455/561, 572, 195.1, 252.1, 343.1; 363/56.03, 56.04, 56.05, 56.08, 56.1, 363/56.11; 330/298, 127
See application file for complete search history.

(56) References Cited

U.S. PATENT DOCUMENTS

| | | | | |
|---|---|---|---|---|
| 5,794,125 | A * | 8/1998 | Grad | 340/636.1 |
| 6,225,756 | B1 * | 5/2001 | Gitsevich | 315/248 |
| 6,308,047 | B1 * | 10/2001 | Yamamoto et al. | 455/73 |
| 6,775,525 | B1 * | 8/2004 | Tanoue et al. | 455/127.3 |
| 6,961,554 | B1 * | 11/2005 | Constantin | 455/341 |
| 6,980,447 | B1 * | 12/2005 | Schaible et al. | 363/56.05 |
| 7,197,284 | B2 * | 3/2007 | Brandt et al. | 455/78 |
| 7,215,932 | B2 * | 5/2007 | Bhatti | 455/127.1 |
| 7,340,227 | B2 * | 3/2008 | Yoshimi et al. | 455/127.1 |
| 7,444,118 | B2 * | 10/2008 | Boh et al. | 455/39 |
| 2002/0126829 | A1 * | 9/2002 | Van Wonterghem | 379/322 |
| 2003/0054778 | A1 * | 3/2003 | Hecht | 455/115 |
| 2005/0043004 | A1 * | 2/2005 | Kaizaki et al. | 455/326 |
| 2006/0025104 | A1 * | 2/2006 | Reed et al. | 455/343.1 |
| 2006/0046683 | A1 * | 3/2006 | Goddard | 455/343.5 |
| 2007/0093225 | A1 * | 4/2007 | Murakami et al. | 455/252.1 |

* cited by examiner

*Primary Examiner* — Andrew Wendell
(74) *Attorney, Agent, or Firm* — Volpe and Koenig, P.C.

(57) ABSTRACT

A wireless communication system base station (20) includes a base station transceiver (26) that has at least one operative component (32) for facilitating wireless communications. A current limiting device (36) includes at least one field effect transistor for selectively controlling current flow to a capacitive stability device (34) associated with at least one of the operative components (32). In the disclosed example, the current limiting device (36) is in series with the capacitive stability device (34) but in parallel with the operative component (32).

18 Claims, 2 Drawing Sheets

WIRELESS COMMUNICATION BASE STATION WITH CURRENT LIMITING CAPABILITY

FIELD OF THE INVENTION

This invention generally relates to communication. More particularly, this invention relates to wireless communication systems.

DESCRIPTION OF THE RELATED ART

Wireless communication systems typically include base stations that are arranged to provide wireless communication service over a selected geographic region, for example. Base stations typically include an antenna and a base station transceiver (BTS). The operative components of the BTS typically include a DC-DC converter. A stability capacitor typically is placed in parallel with at least the DC-DC converter to provide stability in a known manner.

Introducing a stability capacitor provides the advantage of more reliable operation, however, there is a drawback. During start-up conditions, for example, the stability capacitor will cause an undesirably high current draw until the capacitor is fully charged, for example. In some instances, the current rush can be 200 times greater than the steady state current of the operative components of the BTS. Such a high current draw may damage some components and, at least, typically triggers a battery or other powering device shutdown.

To address that situation, the typical approach is to include a current limiting field effect transistor (FET) that throttles the current to the operative components during start up conditions. While this approach has proven useful, those skilled in the art are always striving to make improvements. For example, the arrangement of the FET in series with the capacitive stability device and the operative components requires the FET to be designed to accommodate the steady state current of the operative components during normal operation. This introduces additional cost into a BTS. Another issue presented by commonly used current limiting FETs is that they require heat sink capability to absorb heat generated during operation. Adding additional heat sink components adds further cost to a BTS.

It would be useful to have a new arrangement that does not have the added costs associated with typical current limiting FETs while still providing the current protection capability of known arrangements.

SUMMARY OF THE INVENTION

An exemplary embodiment of a base station for use in a wireless communication system includes a power supply. At least one operative component that is powered by the power supply facilities wireless communications. A capacitive stability device is in parallel with the at least one operative component. A current limiting device is in series with the capacitive stability device between the power supply and the capacitive stability device. The current limiting device is in parallel with the at least one operative component.

Such an arrangement provides current limiting capabilities without requiring the current for powering the at least one operative component during normal operation to flow through the current limiting device. One advantage to this example is that the current limiting device can be sized to handle the in rush current to the capacitive stability device and then to handle a steady state current flowing toward that device, which is significantly lower than the steady state current flowing to the at least one operative component. This introduces substantial cost savings in a base station.

An exemplary method of controlling power to at least one operative component within a base station that is useful for facilitating wireless communications includes selectively throttling current to a capacitive stability device that is in parallel with the operative component without throttling the current to the operative component The various features and advantages of this invention will become apparent to those skilled in the art from the following detailed description. The drawings that accompany the detailed description can be briefly described as follows.

DETAILED DESCRIPTION

Figure 1:
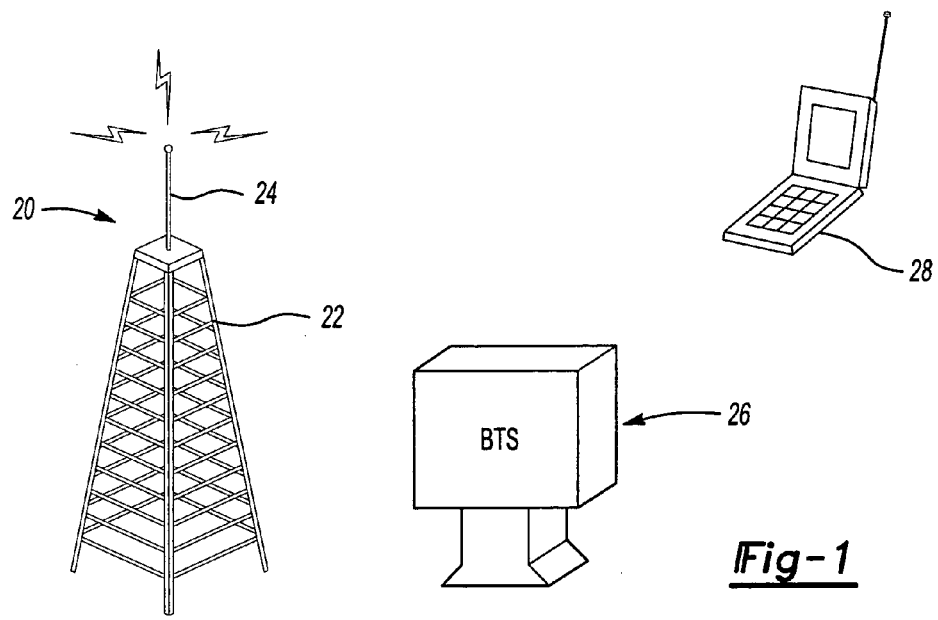
FIG. 1 schematically illustrates selected portions of a wireless communication system including a base station designed according to an embodiment of this invention.

FIG. 1 schematically shows selected portions of a wireless communication system including a base station 20. A radio tower 22 supports an antenna 24 in a known manner. A base station transceiver (BTS) 26 is used in a known manner for facilitating communications between the base station 20 and at least one mobile station 28.

The BTS 26 includes operative components that facilitate wireless communications in a known manner. One such component is a DC-DC converter that operates in a known manner. It is desirable to include a capacitive stability device in parallel with the DC-DC converter. The illustrated example includes such an arrangement.

Figure 2:
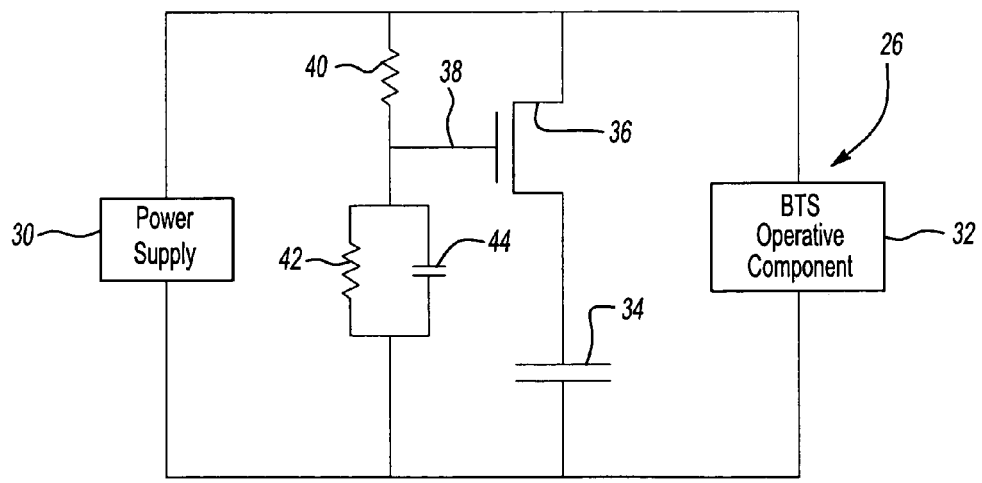
FIG. 2 schematically illustrates an example arrangement designed according to an embodiment of this invention.

Referring to FIG. 2, selected portions of the BTS 26 are schematically shown. A power supply 30 provides power for the operative components 32 to operate as needed to facilitate wireless communications. A capacitive stability device 34 is in parallel with the operative components 32. In the illustrated example, the capacitive stability device 34 comprises a capacitor. The capacitor of the capacitive stability device 34 is sized to meet the needs of a particular situation. Those skilled in the art who have the benefit of this description will be able to select appropriate components to meet their particular needs.

The illustrated example includes a current limiting device 36 in series with the capacitive stability device 34 to protect against current overload conditions such as during start up, for example. In the illustrated example, the current limiting device 36 comprises a field effect transistor (FET). The current limiting device 36 is in series with the capacitive stability device 34 and in parallel with the operative components 32. This is different than traditional arrangements where the current limiting device was placed in series with the operative components 32.

The FET of the current limiting device 36 operates in a generally known matter to throttle initial charging current going to the capacitive stability device 34 but presenting very low resistance (e.g., the FET is open wide) during steady state operation.

The illustrated example includes a gate 38 of the FET coupled with a resistor 40 and a parallel combination of a resistor 42 and a capacitor 44. The resistor 40, for example, raises the gate voltage of the FET in a known manner.

Having the current limiting device 36 only in series with the capacitive stability device 34 and in parallel with the operative components 32 provides significant advantages.

For example, the FET may be sized for handling the steady state current flowing to the capacitive stability device 34 rather than the steady state current flowing to the operative components 32. In one example, the operative components draw a steady state current on the order of 100 amps. Some examples include a 90 amp steady state current to the operative components 32. During steady state operation, the capacitive stability device 34 receives ripple current of a significantly lower magnitude. Some examples include a 5 amp current during steady state operation flowing to the capacitive stability device 34. As known, such ripple currents are associated with switching in a DC-DC converter. The FET of the current limiting device 36 can therefore be sized to accommodate a steady state current of approximately 5 amps rather than one of approximately 100 amps. This allows for cost savings compared to prior arrangements.

Figure 3:
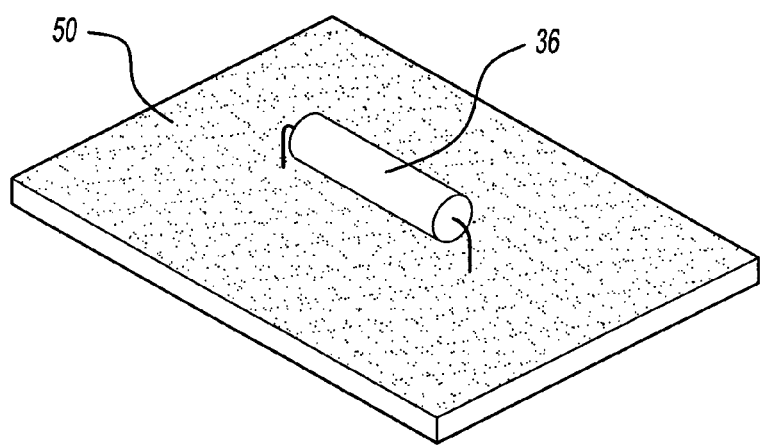
FIG. 3 schematically illustrates a selected component of the embodiment of FIG. 2.

Because the FET of the current limiting device 36 can be sized to accommodate significantly smaller steady state current compared to previous arrangements, the heat sink capacity in the BTS for accommodating the FET can be more advantageously and economically realized. The smaller sized FET can be mounted on a circuit board substrate typically used for printed circuit boards. FIG. 3 schematically illustrates such a circuit board 50 on which the FET of the current limiting device 36 is supported. The circuit board 50 provides the primary heat sink capacity for absorbing heat associated with operation of the current limiting device 36.

Figure 4:
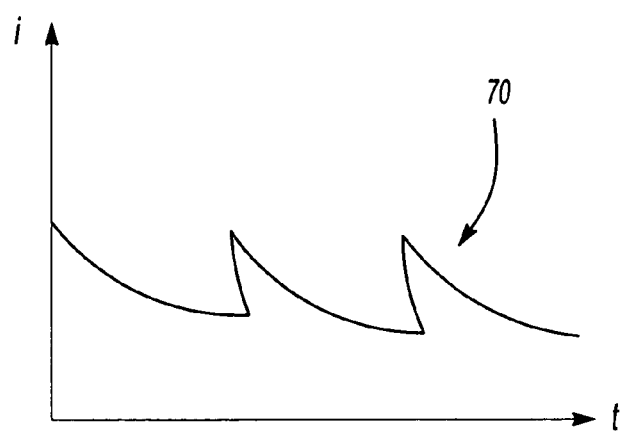
FIG. 4 is a graphical illustration showing an example current control strategy in one embodiment.

Some examples include a plurality of capacitors within the capacitive stability device 34. One example includes arranging such capacitors in parallel and configuring the current limiting device and the time constants to sequentially bring each capacitor on line during start up to control the in rush current in a generally sequential manner. One example includes bringing a first capacitor on line and allowing it to be nearly completely charged before bringing the next capacitor on line. This results in a lower magnitude for the in rush current over the start up charging time for all of the capacitors combined. One example results in a generally saw tooth profile of the charging current over time as shown in the profile 70 of FIG. 4. One example includes FETs in parallel with each other and in series with respective capacitors. Such a strategy allows for using smaller capacity FETs in a current limiting device 36 to realize the advantages of the disclosed example even in situations where there is a relatively large bulk capacitance associated with the capacitive stability device 34.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A base station for use in a wireless communication system, comprising:
    a power supply;
    at least one operative component useful for facilitating wireless communications, the at least one operative component is powered by the power supply;
    a capacitive stability device in parallel with the at least one operative component; and
    a current limiting device in series with the capacitive stability device between the power supply and the capacitive stability device, the current limiting device in parallel with the at least one operative component.

2. The base station of claim 1, wherein the capacitive stability device comprises at least one capacitor.

3. The base station of claim 1, wherein the current limiting device comprises at least one field effect transistor in series with the capacitive stability device.

4. The base station of claim 3, wherein
    the at least one operative component draws a generally steady state current from the power supply having a first magnitude; and
    the at least one field effect transistor is configured to have a steady state current flowing through the at least one field effect transistor having a second, lower magnitude.

5. The base station of claim 4, wherein the first magnitude is 100 amps and the second magnitude is 5 amps.

6. The base station of claim 4, wherein the second magnitude corresponds to a ripple current associated with the at least one operative component.

7. The base station of claim 3, comprising a circuit board substrate supporting the at least one field effect transistor and wherein the circuit board substrate is a primary heat sink for the current limiting device.

8. The base station of claim 1, comprising a circuit board associated with the current limiting device and wherein the circuit board is a primary heat sink for the current limiting device.

9. The base station of claim 1, wherein the capacitive stability device comprises a plurality of capacitors and the current limiting device controls power supply to the capacitors in a sequential manner.

10. A base station for use in a wireless communication system, comprising:
    a power supply;
    at least one operative component useful for facilitating wireless communications, the at least one operative component is powered by the power supply;
    a capacitive stability device in parallel with the at least one operative component; and
    a current limiting device in series with the capacitive stability device between the power supply and the capacitive stability device, the current limiting device is in parallel with the at least one operative component, the current limiting device comprises
    at least one field effect transistor in series with the capacitive stability device;
    a resistor between a gate of the field effect transistor and the power supply; and
    a parallel combination of a resistor and a capacitor on an opposite side of the gate of the field effect transistor.

11. A method of controlling power supply within a base station having a capacitive stability device in parallel with at least one operative component of the base station that is useful for facilitating wireless communications using a current limiting device in series with the capacitive stability device and in parallel with the at least one operative component, comprising:
    throttling power supply to the capacitive stability device without passing a steady state power supply to the at least one operative component through the current limiting device.

12. The method of claim 11, wherein the capacitive stability device comprises at least one capacitor.

13. The method of claim 11, wherein the current limiting device comprises at least one field effect transistor in series with the capacitive stability device.

14. The method of claim 13, comprising
providing a generally steady state current having a first magnitude to the at least one operative component; and
providing a generally steady state current to the at least one field effect transistor having a second, lower magnitude.

15. The method of claim 14, wherein the first magnitude is 100 amps and the second magnitude is 5 amps.

16. The method of claim 14, wherein the second magnitude corresponds to a ripple current associated with the at least one operative component.

17. The method of claim 13, comprising
supporting the at least one field effect transistor on a circuit board substrate; and
using the circuit board substrate as a primary heat sink for the current limiting device.

18. The method of claim 11, comprising
supporting at least a portion of the current limiting device on a circuit board; and
using the circuit board as a primary heat sink for the current limiting device.

* * * * *